(12) United States Patent
Brunard

(10) Patent No.: US 9,499,211 B2
(45) Date of Patent: Nov. 22, 2016

(54) VENTILATION CROSSMEMBER FOR A MOTOR VEHICLE

(75) Inventor: Christophe Brunard, Meru (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 1502 days.

(21) Appl. No.: 12/064,818

(22) PCT Filed: Aug. 16, 2006

(86) PCT No.: PCT/FR2006/001950
§ 371 (c)(1),
(2), (4) Date: May 15, 2008

(87) PCT Pub. No.: WO2007/026063
PCT Pub. Date: Mar. 8, 2007

(65) Prior Publication Data
US 2008/0217963 A1   Sep. 11, 2008

(30) Foreign Application Priority Data

Aug. 31, 2005 (FR) .................................. 05 08941

(51) Int. Cl.
*B62D 25/14* (2006.01)
*B60H 1/00* (2006.01)

(52) U.S. Cl.
CPC ........... *B62D 25/142* (2013.01); *B60H 1/0055* (2013.01); *B60H 1/00564* (2013.01); *B60K 2350/401* (2013.01)

(58) Field of Classification Search
CPC ...................................................... B60H 1/0055
USPC ......... 454/69, 127, 152, 155, 162, 163, 153, 454/154, 305; 296/193.02
See application file for complete search history.

(56) References Cited

U.S. PATENT DOCUMENTS

| | | | |
|---|---|---|---|
| 4,286,506 A * | 9/1981 | Yanagida | 454/154 |
| 5,364,159 A * | 11/1994 | Kelman et al. | 296/192 |
| 5,503,178 A * | 4/1996 | Miskelley et al. | 137/67 |
| 5,538,293 A * | 7/1996 | Kolt | 285/24 |
| 7,022,008 B1 * | 4/2006 | Crocker | 454/69 |
| 2003/0083006 A1* | 5/2003 | Brancheriau et al. | 454/155 |
| 2004/0046424 A1* | 3/2004 | Nakajima | 296/208 |
| 2006/0199492 A1* | 9/2006 | Ozeki | 454/69 |

FOREIGN PATENT DOCUMENTS

| | | |
|---|---|---|
| DE | 3500358 A1 * | 7/1986 |
| DE | 197 03 519 C1 | 4/1998 |

(Continued)

*Primary Examiner* — Steven B McAllister
*Assistant Examiner* — Brittany Towns
(74) *Attorney, Agent, or Firm* — Young & Thompson

(57) ABSTRACT

An aeraulic crossmember for a motor vehicle includes a beam (12) in the form of a section forming a channel (13) along the length of the beam. The aforementioned channel is equipped with an opening (14) on one of the side faces thereof and contains a duct (15) which is made from rigid insulating material. The duct is also equipped with an opening which is defined by a mouth that is located opposite the opening in the channel and which is slightly smaller than the latter. The opening in the insulating duct is located inside the channel. The crossmember includes an interface device (16) in the form of a sleeve which extends through the opening (14) in the channel in order to connect the mouth of the opening in the duct in a leaktight manner to an air vent that is located on the exterior of the crossmember.

35 Claims, 6 Drawing Sheets

(56) References Cited

FOREIGN PATENT DOCUMENTS

| | | |
|---|---|---|
| DE | 100 05 718 A1 | 8/2001 |
| FR | 2725404 A1 * | 4/1996 |
| FR | 2 789 043 A | 8/2000 |
| FR | 2845947 A1 * | 4/2004 |
| JP | 10044762 A * | 2/1998 |
| JP | 2002087047 A * | 3/2002 |
| JP | 2003112516 A * | 4/2003 |
| WO | 2006/002996 A1 | 1/2006 |

* cited by examiner

VENTILATION CROSSMEMBER FOR A MOTOR VEHICLE

The present invention relates to a ventilation crossmember for a motor vehicle, the crossmember being of a type comprising a beam in the form of a section member forming a channel along the length of the beam, said channel presenting an opening in one of its side faces and containing a duct of rigid insulating material that likewise presents an opening defined by a mouth in register with the opening of the channel and of slightly smaller size.

BACKGROUND OF THE INVENTION

Ventilation crossmembers are to be found in motor vehicles, in particular as elements of dashboard panel crossmembers.

In addition to their functions concerning the rigidity of the vehicle, they are used for conveying a flow of air coming from the air conditioner or the heater to vents that are disposed in the dashboard panel. They thus include a duct of insulating material for conveying this flow of air to the cabin, while preserving its temperature properties.

The crossmember is made of metal. Passing air directly along the metal tube gives rise to large amounts of heat being lost from the air being conveyed. It is therefore necessary to line the metal crossmember with a material that is not as good a conductor as metal. Ventilation crossmembers generally include a ventilation duct of plastics material placed inside the metal crossmember.

There are numerous techniques by which a ventilation crossmember with a plastics material duct can be made.

In a first technique, the inside duct is overmolded within the tubular metal crossmember out of plastics material. That technique is complex to develop.

In a second technique, the plastic duct is inserted into the channel.

In a first variant, the duct is inserted into the channel during fabrication thereof, e.g. while it is being made from two metal half-shells that are fitted one to the other. Under such circumstances, the duct presents an emerging portion that conventionally provides the connection with the vent.

In a second variant, the metal beam is fabricated initially and presents, at least in part, a tubular zone. Under such circumstances, the duct is introduced into the crossmember by being slid along the tubular channel, and as a result it does not present any emerging portion.

In a third variant, the ventilation crossmember is fabricated by folding a metal sheet so that the section of the crossmember forms a 6-shape or an 8-shape. The closed zone, or one of the closed zones with an 8-shape, forms a channel into which the plastics material duct is introduced by sliding.

Furthermore, the top portion of the 6-shaped section member is also considered as being a tubular zone even if it is not completely closed, and it may also contain a duct of insulating material for channeling of a flow of gas.

At the location provided for a vent, an opening is made in the channel and also in the duct.

Nevertheless, in the two last-described variant fabrication techniques, the opening of the duct lies inside the channel. Consequently, there arises the problem of connecting the duct to the vent while complying with overall ventilation constraints.

The object of the invention is thus to solve this problem.

SUMMARY OF THE INVENTION

The invention thus provides a ventilation crossmember for a motor vehicle, the crossmember being of a type comprising a beam in the form of a section member forming a channel along the length of the beam, said channel presenting an opening in one of its side faces and containing a duct of rigid insulating material that likewise presents an opening defined by a mouth in register with the opening of the channel and of slightly smaller size, the opening of the duct of insulating material being inside the channel, the crossmember being characterized in that it includes an interface device in the form of a sleeve passing through the opening of the channel to connect the mouth of the opening of the duct in leaktight manner to a vent situated outside said crossmember.

Other characteristics of the invention are as follows:
- the interface device includes a gasket having two lips for clamping onto the mouth of the duct;
- the lips are spaced apart at rest by less than the thickness of the wall of the mouth;
- the interface device includes on its outside face a shoulder that comes to bear against the outside face of the channel;
- the interface device includes on its outside face a plurality of clip-fastener tongues for bearing against the inside face of the channel;
- the shoulder and the clip-fastener tongues clamp onto the edge of the opening of the channel so that the interface device is rigidly fastened onto said channel;
- the interface device includes an outer gasket of deformable material suitable for providing sealing between said interface device and the vent; and
- the interface device is of axial length lying in the range 5 millimeters (mm) to 20 mm.

BRIEF DESCRIPTION OF THE DRAWINGS

The invention can be better understood on reading the following description given purely by way of example and made with reference to the accompanying drawings, in which.

DETAILED DESCRIPTION OF THE PREFERRED EMBODIMENTS

Figure 1:
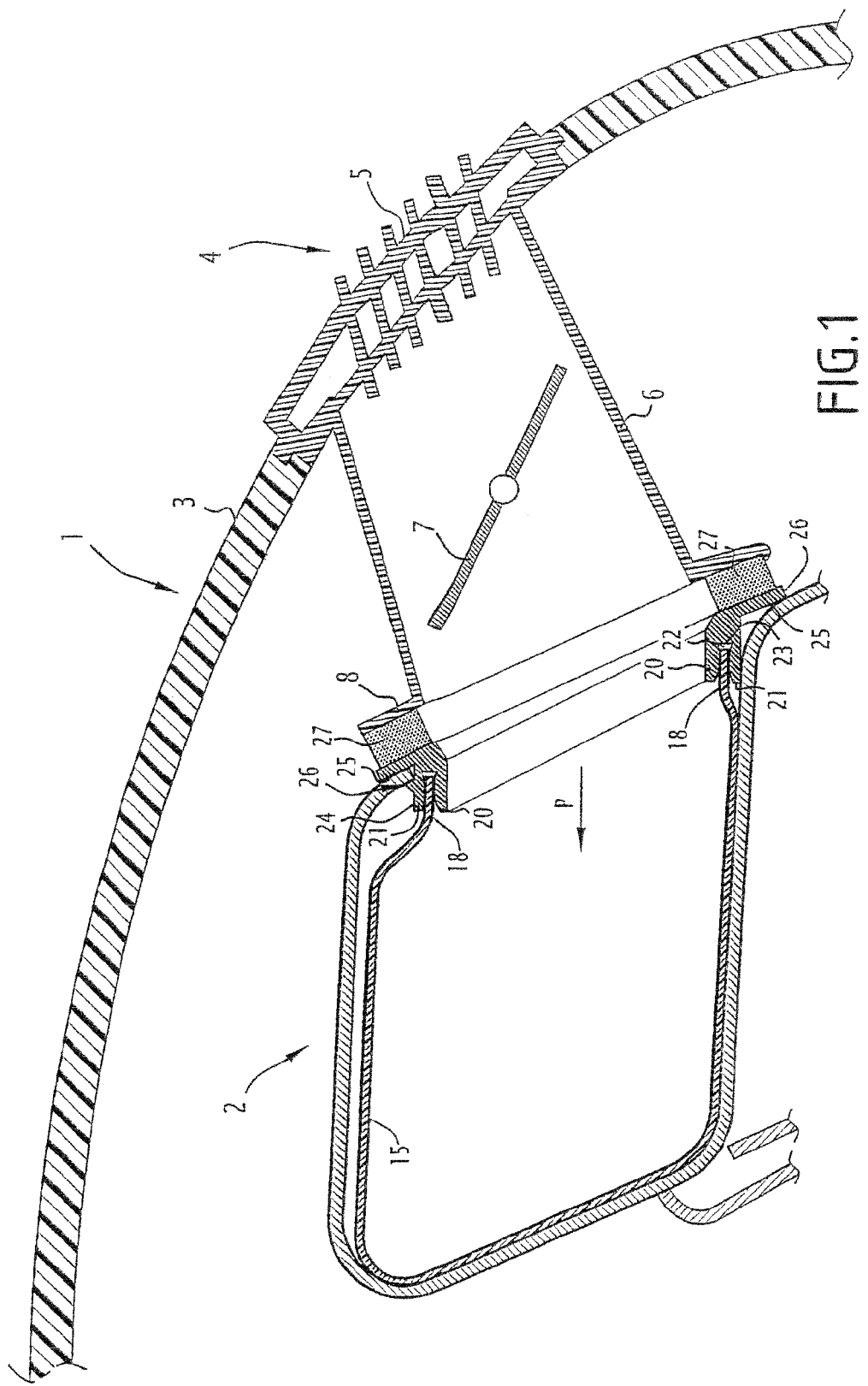
FIG. 1 is a section view of a motor vehicle dashboard panel including a ventilation crossmember together with its interface device of the invention, and a vent.

As shown in FIG. 1, a motor vehicle dashboard panel 1 includes a ventilation crossmember 2 performing a structural function for the vehicle, i.e. contributing to stiffening the structure of the vehicle. It is also suitable for conveying air towards the passengers of the vehicle, and finally it supports certain components such as a steering column or an airbag safety device.

The dashboard panel 1 presents a cover 3 carried by the ventilation crossmember 2. The cover 3 defines the outside shape of the dashboard panel and it supports certain elements. In particular, it supports vents 4 that pass through the cover 3 in order to convey air from the ventilation crossmember 2 to the inside of the cabin.

The vent 4 comprises in conventional manner a grille 5 pressed against the cover 3 and extended towards the ventilation crossmember 2 behind the cover 3 by a neck 6 fitted with a moving flap 7. The neck 6 is constituted by a generally tubular duct and presents an outwardly-directed connection collar 8.

Figure 2:
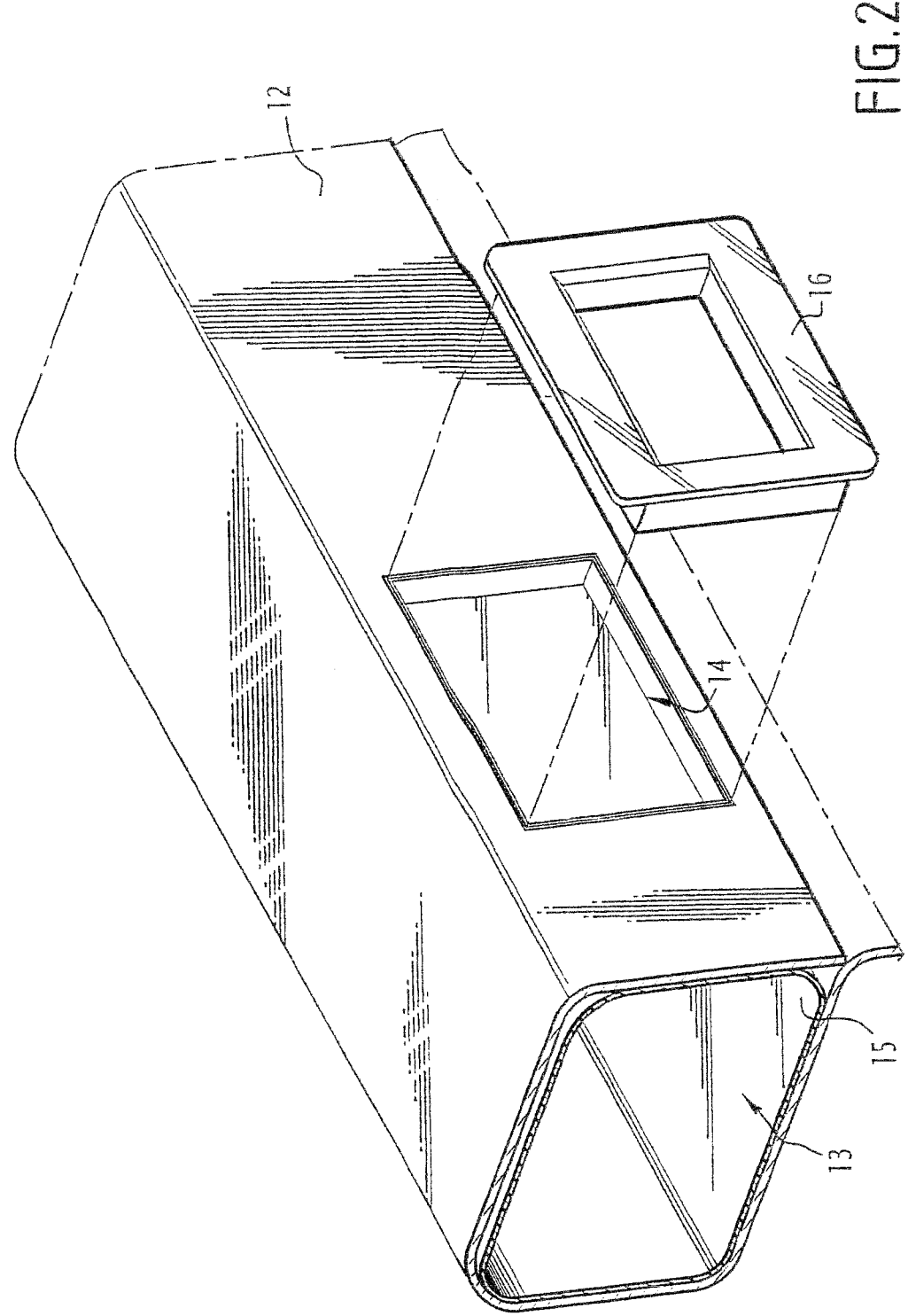
FIG. 2 is a face view of a crossmember of the invention.
Figure 3:
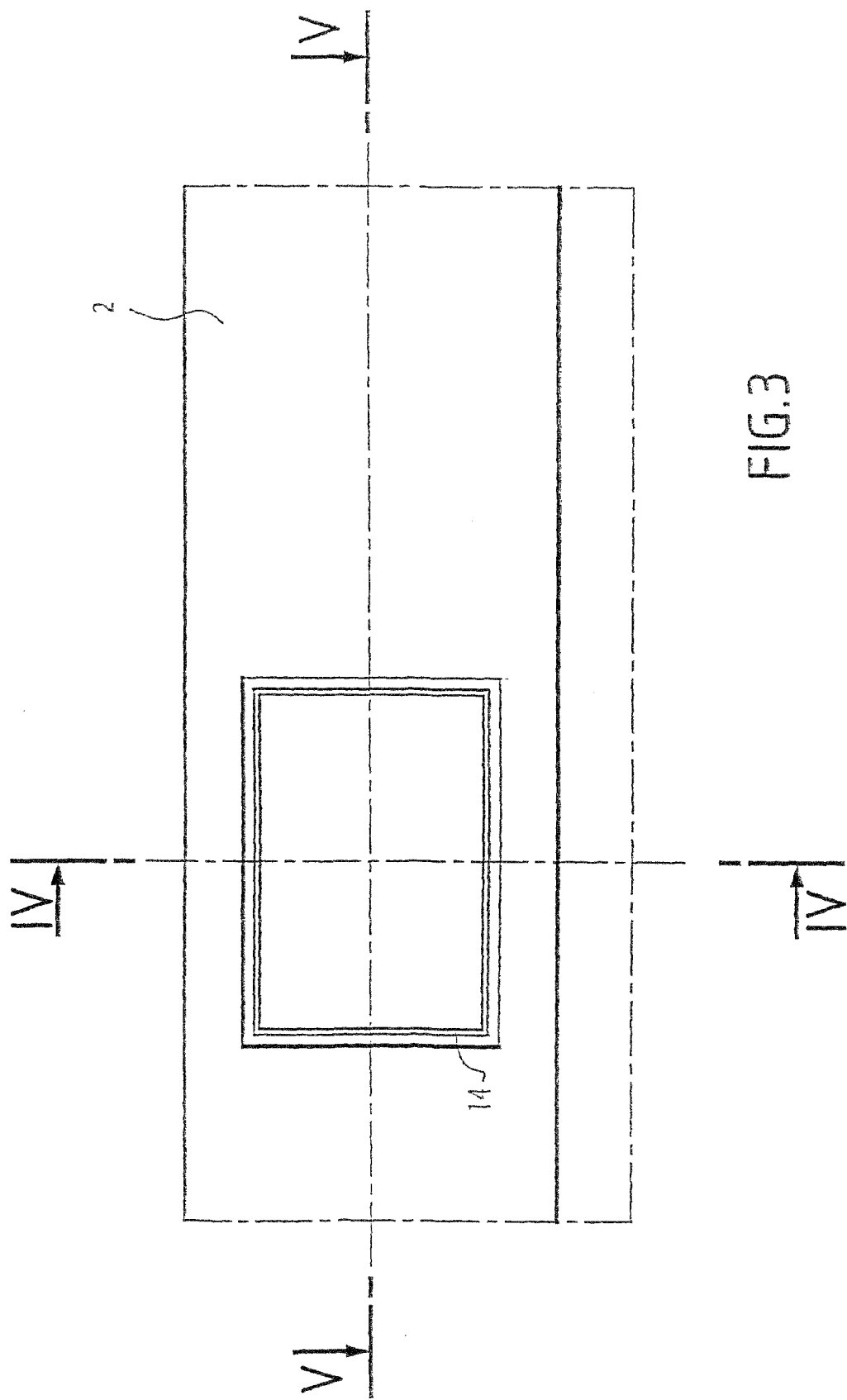
FIG. 3 is a section view on a larger scale showing the FIG. 2 crossmember.
Figure 4:
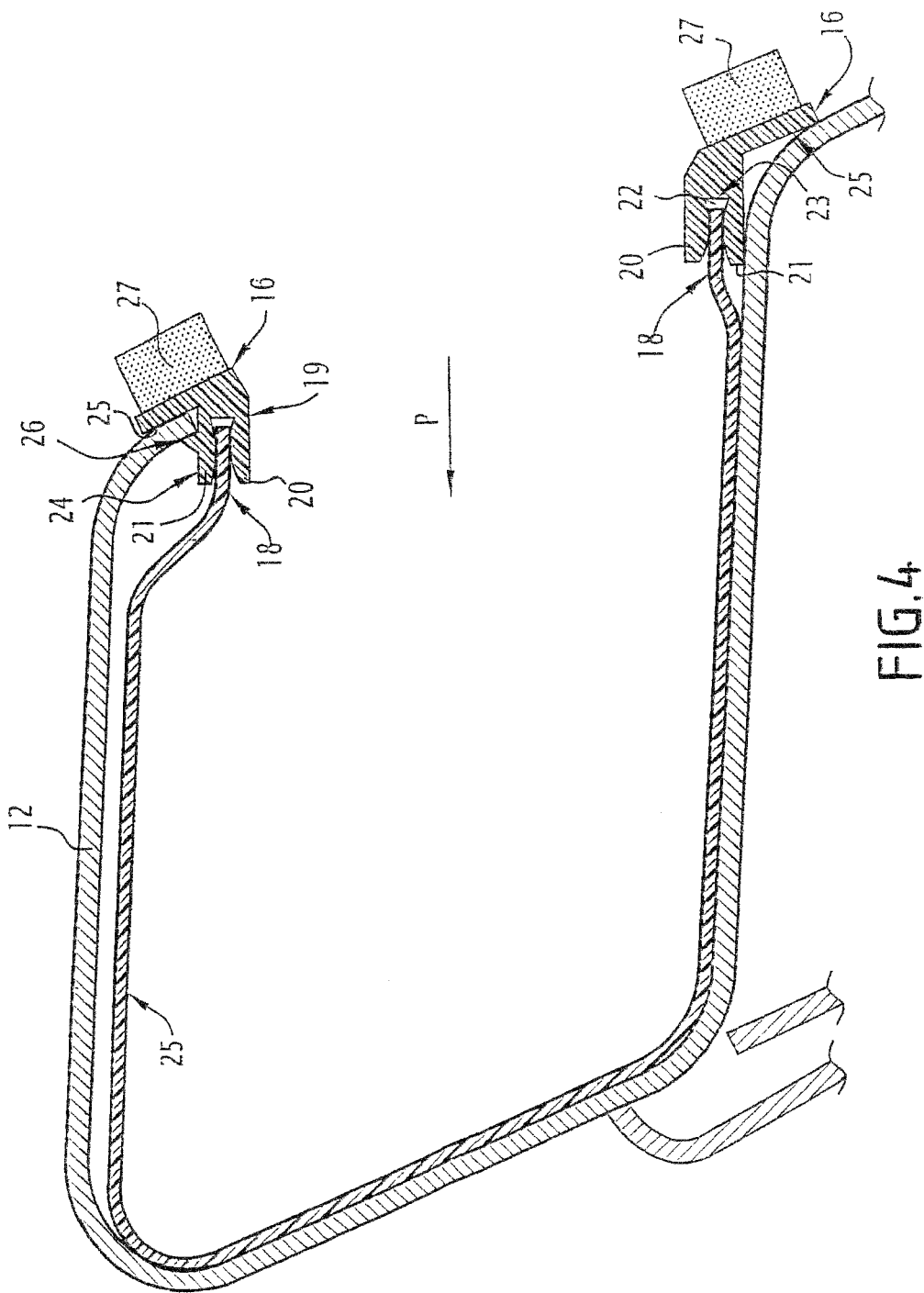
FIG. 4 is a section view on IV-IV of the FIG. 2 crossmember.
Figure 5:
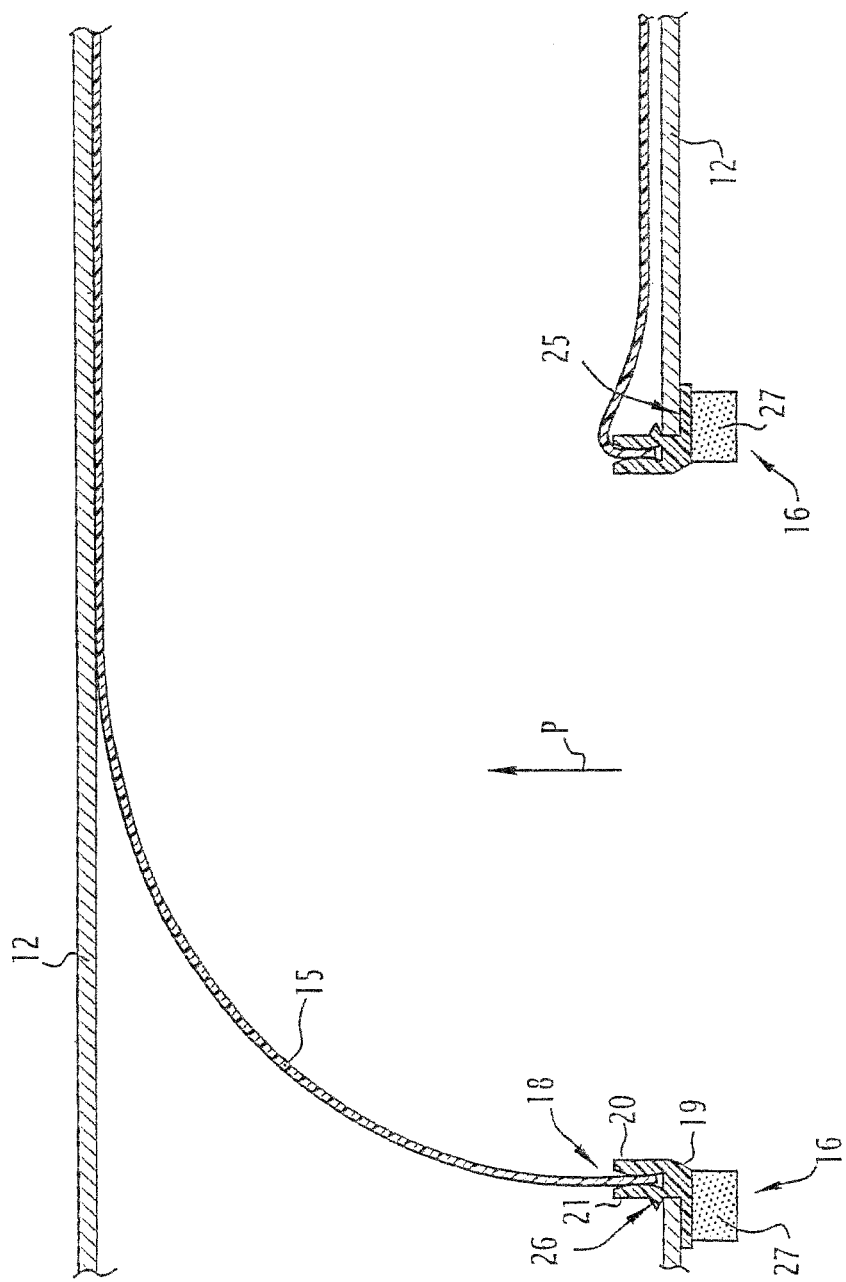
FIG. 5 is a section view on V-V of the FIG. 2 crossmember.
Figure 6A:
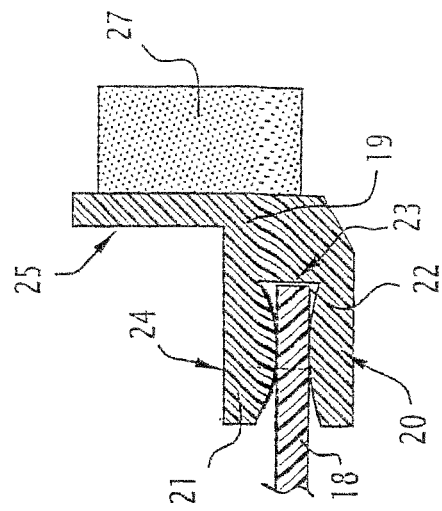
FIG. 6A is a section view showing a detail of an interface device at rest.
Figure 6B:
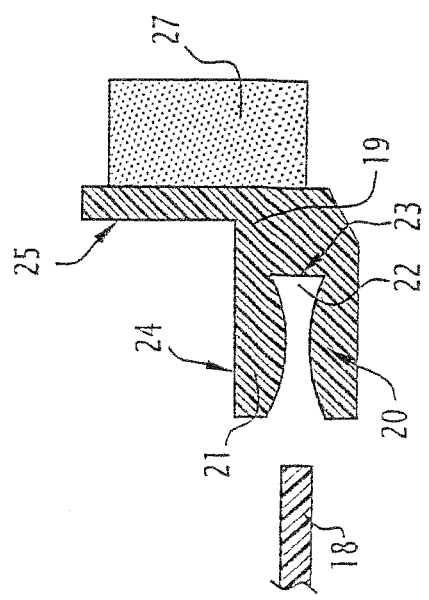
FIG. 6B is a section view of the same interface device of FIG. 6A when in position on the crossmember.

The motor vehicle ventilation crossmember 2 comprises, see FIG. 2, a beam 12 in the form of a section member forming a channel 13 running along the length of the beam.

The channel presents an opening 14 in one of its side faces.

It contains a duct 15 of rigid insulating material that also presents an opening in register with the opening in the channel and of slightly smaller size.

The ventilation crossmember also includes an interface device 16 in the form of a sleeve.

The interface device 16 is positioned in the opening 14 of the channel.

The vent 4 is fastened to the interface device 16 by the collar 8.

The opening of the duct 15 is defined by an annular mouth 18, see FIGS. 3, 4, 5, 6A, and 6B.

The interface device 16 includes, on its face that is in front relative to the direction given by arrow P, a gasket 19 having two lips 20, 21 that clamp onto the mouth 18 of the duct. The lips 20 and 21 are made of an elastic material.

The lips 20 and 21 define a groove 22 having a bottom 23 of width greater than the minimum spacing between the lips 20, 21 at rest, i.e. when the interface device 16 is not fastened onto the mouth 18.

The interface device 16 also has, on its outside face 24, a shoulder 25 together with a plurality of clip-fastener tongues 26.

In zones containing a clip-fastener tongue 26, the outside surface 24 is positioned so that the distance between the outside face 24 of the interface device and the edge of the opening 14 of the channel 13 is less than the thickness at rest of the tongues, so that the clip-fastener tongues come to bear against the inside face of the channel 13.

In addition, on its face that is at the rear relative to the orientation given by arrow P, the interface device 16 includes a gasket 27 of deformable material having approximately the shape of the outside zone of the collar 8 of the neck of the vent so as to provide sealing between the interface device 16 and the vent 4.

The axial length of the interface device 16, i.e. its length along the axis of arrow P, preferably lies in the range 5 mm to 20 mm.

During assembly, the interface device is pushed towards the inside of the channel in the direction of arrow P. The lips 20, 21 that at rest are spaced apart by less than the thickness of the wall of the mouth 18 become splayed apart under the effect of the pressure exerted by the mouth 18. Since the lips posses a degree of elasticity, they pinch closely onto the collar 8, thereby providing sealing between the duct 15 and the interface device 16.

The clip-fastener tongues 26 are pushed into the inside of the opening of the channel 13, by retracting as they go past the edge of the opening.

The interface device is pushed until the shoulder 25 comes to bear against the outside face of the channel 13. At that moment, the clip-fastener tongues 26 are positioned inside the channel 13 and they return to their rest position. The edge of the opening in the channel 13 is thus clamped between the shoulder 25 and the clip-fastener tongues 26.

This makes it possible, advantageously, to fasten the interface device 16 rigidly to the beam 12. Since the interface device 16 is also secured to the duct 15 via the lip gasket 19, that makes it possible advantageously to secure the duct 15 to the beam 12.

In a variant embodiment, the gasket 27 is fastened to the collar 8 of the neck 6, and not to the rear face of the interface device 16 as in the above-described embodiment. The vent 4 is then connected to the interface device 16 by the gasket 27 being pressed thereagainst.

The invention claimed is:

1. A ventilation crossmember for a motor vehicle, comprising:
    a beam in the form of a section member forming a channel along the length of the beam, said channel having side faces and presenting an opening in one of said side faces; and
    a duct extending inside the channel, said duct being made of rigid insulating material and having an opening defined by a mouth in register with the opening of the channel,
    the opening of the duct having a cross section of smaller size than the opening of the channel, the opening of the duct of insulating material being inside the channel,
    the crossmember including an interface device in the form of a sleeve engaged through the opening of the channel and connecting the mouth of the opening of the duct in leaktight manner to a vent situated outside said crossmember,
    the interface device having a first end located inside the channel and being connected in a leaktight manner to the mouth of the opening of the duct,
    the interface device having a second end located outside the channel and being connected in a leaktight manner to said vent,
    the interface device being rigidly fastened to the channel,
    the interface device having two lips that engage with the mouth of the opening of the duct,
    a wall of the duct surrounding the opening of the duct being separated from a wall that surrounds the opening of the channel by an empty space,
    the mouth of the opening of the duct protruding from the wall of the duct surrounding the opening of the duct inside the empty space, and
    the mouth of the opening of the duct comprising a wall, inside the empty space, that cooperates with the two lips inside the empty space, and extends along an insertion direction of the two lips toward an exterior of the channel, the mouth of the opening of the duct projecting outward from the wall of the duct inside the empty space and toward the opening of the channel.

2. The ventilation crossmember according to claim 1, wherein the interface device includes a gasket having two lips for clamping onto the mouth of the opening of the duct.

3. The ventilation crossmember according to claim 2, wherein the lips are spaced apart at rest by less than a thickness of the wall of the mouth of the opening of the duct.

4. The ventilation crossmember according claim 1, wherein the interface device includes a shoulder on an outside face of the interface device that bears against an outside face of the channel.

5. The ventilation crossmember according claim 4, wherein the interface device includes a plurality of clip-fastener tongues on the outside face of the interface device for bearing against an inside face of the channel.

6. The ventilation crossmember according claim 5, wherein the interface device includes a plurality of clip-fastener tongues on the outside face of the interface device for bearing against the inside face of the channel, and
wherein the shoulder and the clip-fastener tongues clamp onto an edge of the opening of the channel so that the interface device is rigidly fastened onto said channel.

7. The ventilation crossmember according claim 1, wherein the interface device includes an outer gasket of deformable material suitable for providing sealing between said interface device and the vent, and a tubular sleeve engaged through the opening of the channel and directly connected to the opening of the inner duct, said outer gasket being distinct from said tubular sleeve.

8. The ventilation crossmember according claim 1, wherein the interface device is of axial length lying in the range 5 mm to 20 mm.

9. A motor vehicle dashboard panel, comprising:
a crossmember according to claim 8;
a cover carried by the crossmember; and
a vent passing through the cover and connected to the ventilation crossmember.

10. The ventilation crossmember according to claim 4, wherein said crossmember includes an outer gasket of deformable material suitable for providing sealing between said interface device and the vent, said outer gasket being secured to the shoulder of the interface device.

11. The ventilation crossmember according to claim 1, wherein said interface device has a tubular sleeve engaged through the opening of the channel and connected in a leaktight manner directly to the opening of the inner duct, and a shoulder bearing against the outside face of the channel, the tubular sleeve and the shoulder being one piece.

12. A ventilation crossmember for a motor vehicle, comprising:
a beam being formed of a section member that forms a channel along the length of the beam, said channel having side faces and presenting an opening in one of said side faces;
a duct extending inside the channel, said duct being made of rigid insulating material and having an opening defined by a mouth in register with the opening of the channel,
the opening of the duct having a cross section of smaller size than the opening of the channel, the opening of the duct of insulating material being inside the channel; and
an interface device comprising a sleeve engaged with the duct through the opening of the channel and connecting the mouth of the opening of the duct in a leaktight manner to a vent situated outside said crossmember,
the interface device having a first end located inside the channel and being connected in a leaktight manner to the mouth of the opening of the duct,
the interface device having a second end located outside the channel and being connected in a leaktight manner to said vent,
the interface device being fastened to the mouth of the opening of the duct,
the interface device has having two lips that engage, with the mouth of the opening of the duct,
a wall of the duct surrounding the opening of the duct and separated, by an empty space, from a wall that surrounds the opening of the channel,
the mouth of the opening of the duct protruding from the wall of the duct surrounding the opening of the duct inside the empty space, and
the mouth of the opening of the duct comprising a wall, inside the empty space, that cooperates with the two lips inside the empty space, and extends along an insertion direction of the two lips toward an exterior of the channel, the mouth of the opening of the duct projecting outward from the wall of the duct inside the empty space and toward the opening of the channel.

13. The ventilation crossmember according to claim 12, wherein an outside face of the interface device includes a shoulder that bears against the outside face of the beam.

14. The ventilation crossmember according to claim 12, wherein the interface device includes an outer gasket of deformable material suitable for providing sealing between said interface device and the vent and a tubular sleeve engaged through the opening of the channel and directly connected to the opening of the inner duct, said outer gasket being distinct from said tubular sleeve.

15. The ventilation crossmember according to claim 12, wherein the interface device has an axial length from 5 mm to 20 mm.

16. The ventilation crossmember according to claim 13, wherein said crossmember includes an outer gasket of deformable material suitable to provide sealing between said interface device and the vent, said outer gasket being secured to the shoulder of the interface device.

17. The ventilation crossmember according to claim 12, wherein said interface device has a tubular sleeve engaged through the opening of the channel and connected in a leaktight manner directly to the opening of the inner duct, and a shoulder that bears against the outside face of the channel, the tubular sleeve and the shoulder being a single piece.

18. The ventilation crossmember according to claim 1, wherein the interface is directly fastened to the channel.

19. The ventilation crossmember according to claim 1, wherein an area of the duct surrounding the opening of the duct is free relative to the channel and is separated from the channel by the empty space.

20. The ventilation crossmember according to claim 12, wherein the interface is directly fastened to the channel.

21. The ventilation crossmember according to claim 12, wherein an area of the duct surrounding the opening of the duct is free relative to the channel and is separated from the channel by an empty space.

22. The ventilation crossmember according to claim 1, wherein the mouth of the opening of the duct is tubular.

23. The ventilation crossmember according to claim 1, wherein the mouth of the opening of the duct presents a free edge with an offset along an insertion direction of the two lips relative to the wall of the channel.

24. The ventilation crossmember according to claim 1, wherein the mouth of the opening of the duct presents a free edge with an offset along an insertion direction of the two lips relative to the wall of the channel.

25. The ventilation crossmember according to claim 1, wherein the wall of the mouth of the opening of the duct is formed in a rigid material.

26. The ventilation crossmember according to claim 1, wherein portion of each of the lips extending into the empty space and the mouth of the duct extending into a groove defined by the lips.

27. The ventilation crossmember according to claim 1, wherein the interface device is snapped on the mouth of the opening of the duct.

28. The ventilation crossmember according to claim 12, wherein the mouth of the opening of the duct comprises a wall adapted to cooperate with the lip, and extending along an insertion direction of the lip.

29. The ventilation crossmember according to claim 12, wherein the mouth of the opening of the duct is tubular.

30. The ventilation crossmember according to claim 12, wherein the mouth of the opening of the duct is projecting outward the wall of the duct toward the opening of the channel.

31. The ventilation crossmember according to claim 12, wherein the mouth of the opening of the duct presents a free edge with an offset along an insertion direction of the lip relative to the wall of the channel.

32. The ventilation crossmember according to claim 12, wherein the mouth of the opening of the duct presents a central axis parallel to an insertion direction of the lip.

33. The ventilation crossmember according to claim 12, wherein the wall of the mouth of the opening of the duct is formed in a rigid material.

34. The ventilation crossmember according to claim 12, wherein a portion of each of the lips extending into the empty space and the mouth of the duct extending into a groove defined by the lips.

35. The ventilation crossmember according to claim 12, wherein the interface device is snapped on the mouth of the opening of the duct.

\* \* \* \* \*